United States Patent
Fay et al.

(10) Patent No.: US 9,491,164 B1
(45) Date of Patent: Nov. 8, 2016

(54) SYSTEM AND METHOD FOR IMPORTING HETEROGENEOUS HASHED PASSWORDS

(71) Applicant: NETSUITE INC., San Mateo, CA (US)

(72) Inventors: Sean Fay, San Francisco, CA (US); Brian Chess, Hillsborough, CA (US)

(73) Assignee: NetSuite Inc., San Mateo, CA (US)

( * ) Notice: Subject to any disclaimer, the term of this patent is extended or adjusted under 35 U.S.C. 154(b) by 116 days.

(21) Appl. No.: 14/464,128

(22) Filed: Aug. 20, 2014

Related U.S. Application Data (60) Provisional application No. 61/868,431, filed on Aug. 21, 2013.

(51) Int. Cl.
*H04L 29/06* (2006.01)
*G06F 21/45* (2013.01)

(52) U.S. Cl.
CPC ............ *H04L 63/083* (2013.01); *G06F 21/45* (2013.01)

(58) Field of Classification Search
CPC . H04L 63/08; H04L 63/0815; H04L 63/083; G06F 21/41; G06F 21/45; G06F 21/46
USPC ............................................................ 726/8
See application file for complete search history.

(56) References Cited

U.S. PATENT DOCUMENTS

| | | | |
|---|---|---|---|
| 6,996,718 B1* | 2/2006 | Henry | G06F 21/41 713/182 |
| 7,171,679 B2 | 1/2007 | Best et al. | |
| 7,228,417 B2 | 6/2007 | Roskind | |
| 7,260,836 B2 | 8/2007 | Roskind et al. | |
| 7,290,278 B2 | 10/2007 | Cahill et al. | |
| 7,577,838 B1 | 8/2009 | Rossmann | |
| 7,765,584 B2 | 7/2010 | Roskind | |
| 7,895,645 B2 | 2/2011 | Bodepudi et al. | |
| 8,196,189 B2 | 6/2012 | Roskind | |
| 2003/0163737 A1* | 8/2003 | Roskind | G06F 21/31 726/6 |
| 2009/0019289 A1* | 1/2009 | Dasgupta | H04L 63/0428 713/183 |
| 2012/0008769 A1 | 1/2012 | Collins et al. | |

* cited by examiner

*Primary Examiner* — Yogesh Paliwal
(74) *Attorney, Agent, or Firm* — Lane Powell PC (57) ABSTRACT

A method is disclosed for migrating a client domain involving identifying a user account entry in a client domain's password table, where the entry includes a user identifier and a first hashed password value, where the first hashed password value is derived from hashing a user password with a client domain hash algorithm. The first hashed password value is re-hashed using a multi-tenant system hash algorithm to obtain a second hashed password value. Another user account entry is created and stored in a multi-tenant system password table along with the second hashed password value and metadata from which the client domain hash algorithm can be determined.

15 Claims, 7 Drawing Sheets

SYSTEM AND METHOD FOR IMPORTING HETEROGENEOUS HASHED PASSWORDS

CROSS REFERENCE TO RELATED APPLICATIONS

This application claims the benefit of priority to U.S. Patent Application No. 61/868,431 filed Aug. 21, 2013 entitled "System and Method for Importing Heterogeneous Hashed Passwords," which is incorporated by reference herein in its entirety for all purposes.

BACKGROUND

Performing computing and data processing functions using a distributed network of computers has become more common as enterprises have increased their reliance on a mobile workforce and have sought ways to reduce the high costs often associated with investments in information technology infrastructure. This has led to the development and deployment of a variety of services and business models, such as web-based services, Software-as-a-Service (SaaS), and cloud-computing based data storage and data processing. Such services and architectures can typically be configured to use varying amounts of computing resources, for example, based on service demand. Some such architectures are "multi-tenant", that is they provide computing, data processing, and data storage functions to multiple independent users or businesses.

Password files are typically used to store user passwords for accounts in a domain, e.g., an email service, an on-line retailer, or a service provider with a web portal. When a user creates a password for the user's account, the user's password is hashed using a predetermined hash algorithm and the resulting hashed value is stored in an entry in the password table for the user's account. The password itself is not stored and the hash function is selected such that the password cannot be easily reverse computed from the hashed value. When a user logs in to their account, the user provides a user identifier and a password, which is hashed using the password hash function for the domain. The password table is searched for an entry corresponding to the user identifier and retrieves the hashed password value stored in the entry. If the hashed value obtained by hashing the password submitted by the user at log in matches the hashed value stored in the matching entry, then access is granted to the user. Different domains typically utilize different hashing algorithms, which yield different hash values for the same password input. These hash algorithms can have different levels of complexity or computational expense associated with them.

In multi-tenant or SaaS systems, multiple domains may be hosted on the same remote server or network of servers. For example, several companies, each with their own domain, may have software or services hosted on a remote service provider's servers. These domains may have used a different hashing algorithm than the multi-tenant system before the domain was migrated to the multi-tenant system. Because the original password value hashed with the domain's original hash function cannot be readily recovered from the hashed value, the user accounts often cannot be directly migrated to a shared password table for the multi-tenant or SaaS service. As a result it is often the case that users with existing accounts in a domain that is migrated to a multi-tenant system, where the domain and the multi-tenant system have different password hash algorithms, are required to reestablish their accounts with new passwords that are hashed using the multi-tenant system's password hash algorithm. This is an inconvenience to users and may delay or prevent their making use of the multi-tenant system. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

According to one embodiment of the present invention, a method for migrating client domains includes identifying at least one user account entry in a client domain password table, where the user account entry includes a user identifier and a first hashed password value, where the first hashed password value is derived from hashing a user password with a client domain hash algorithm, and hashing the first hashed password value using a multi-tenant system hash algorithm to obtain a second hashed password value. The method then calls for creating a user account entry in a multi-tenant system password table having a user identifier, a stored password value, and metadata, where the user identifier for the user account entry in the multi-tenant system corresponds to the user identifier from the user account entry in the client domain password table, the stored password value is the second hashed password value and the client domain hash algorithm can be determined from the metadata (does this mean that the client domain hash algorithm has been provided to the admin of the multi-tenant system by the owner of the client domain?). In another embodiment, the inventive method calls for identifying another user account entry in another client domain password table, where the user account entry includes a user identifier and a third hashed password value, where the third hashed password value is derived from hashing a user password for the user account with another client domain hash algorithm, and hashing the third hashed password value using the multi-tenant system hash algorithm to obtain a fourth hashed password value. This embodiment also calls for creating a user account entry in a multi-tenant system password table having a user identifier, a stored password value, and metadata, where the user identifier for the user account entry in the multi-tenant system corresponds to the another user identifier from the user account entry in the another client domain password table, the stored password value is the fourth hashed password value and the another client domain hash algorithm can be determined from the metadata.

An embodiment of a multi-tenant authorization management system in accordance with certain aspects of the present invention includes a password data store having multiple user entries, each user entry having a user identifier, a stored password hash value and metadata, where the metadata indicates whether or not the stored password hash value associated with the user identifier was hashed using a corresponding client domain hash function and then re-hashed using a multi-tenant system/platform hash function. The system also includes a server with access to the password data store and is configured to receive an access request having a user identifier and a password value, and obtain a user entry from the password data store corresponding to the received user identifier. The server is also configured to determine whether the user entry for the received user identifier includes metadata indicating a corresponding client domain hash function and, if so, hash the received password value using the corresponding client domain hash function to produce a first hash result value and re-hash the first hash result value using the multi-tenant system hash function to generate a second hash result value, compare the second hash result value to the stored password hash value in the user entry for the received user identifier, and reply to the access request with an authorization message if the second received hashed result value matches the stored password hash value in the user entry for the received user identifier. In one embodiment, the multi-tenant authorization management system is further configured to determine whether the metadata for the user entry for the received user identifier indicates no corresponding client domain hash function and, if so, hash the received password value using the multi-tenant system hash algorithm to obtain the second hash result value. In one embodiment, the multi-tenant hash function requires greater computational resources to perform than at least one corresponding client domain hash function.

A computer readable medium, in accordance with certain aspects of the present invention, has computer-executable instructions stored on it which, when executed by a computer, cause the computer to perform a process for migrating client domains. This process involves identifying at least one user account entry in a client domain password table, where the user account entry includes a user identifier and a first hashed password value, where the first hashed password value is derived from hashing a user password with a client domain hash algorithm, hashing the first hashed password value using a multi-tenant system hash algorithm to obtain a second hashed password value, and creating a user account entry in a multi-tenant system password table having a user identifier, a stored password value, and metadata, where the user identifier for the user account entry in the multi-tenant system corresponds to the user identifier from the user account entry in the client domain password table, the stored password value is the second hashed password value and the client domain hash algorithm can be determined from the metadata.

In one embodiment, the computer readable medium includes additional computer-executable instructions that cause the computer to perform the steps of receiving a first access request having a user identifier and a password value and obtaining a user entry in the multi-tenant system password table corresponding to the first received user identifier. In this embodiment, if the metadata from the user entry for the first received user identifier indicates a corresponding client domain hash algorithm, then the instructions will cause the computer to perform hashing the received password value using the corresponding client domain hash algorithm to produce a first hash result value, hashing the first hash result value using the multi-tenant system hash algorithm to obtain a second hash result value, comparing the second hash result value to the stored password value in the user entry for the first received user identifier, and replying to the first access request with an authorization message if the second received hashed result value matches the stored password value in the user entry for the first received user identifier.

According to another aspect of the present invention, a user's account identifier and password are received in an authentication request to a multi-tenant system. The multi-tenant system searches a password table for an entry corresponding to the user's account identifier. If a matching entry is found, then the matching entry is checked for metadata indicating that a first hashed password value stored in the matching entry was generated by a first hash algorithm that is different from a second hash algorithm selected for hashing passwords in the multi-tenant system. If the metadata indicates that the first hashed password value was generated by the first hash algorithm, then the password in the authentication request is hashed using the first hash algorithm to generate a hashed received password value and then hashed with the second hash algorithm to generate a re-hashed password value. If the re-hashed password value matches the first hashed password value, the authentication request is confirmed by the multi-tenant system.

Other objects and advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

Note that the same numbers are used throughout the disclosure and figures to reference like components and features.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Figure 1:
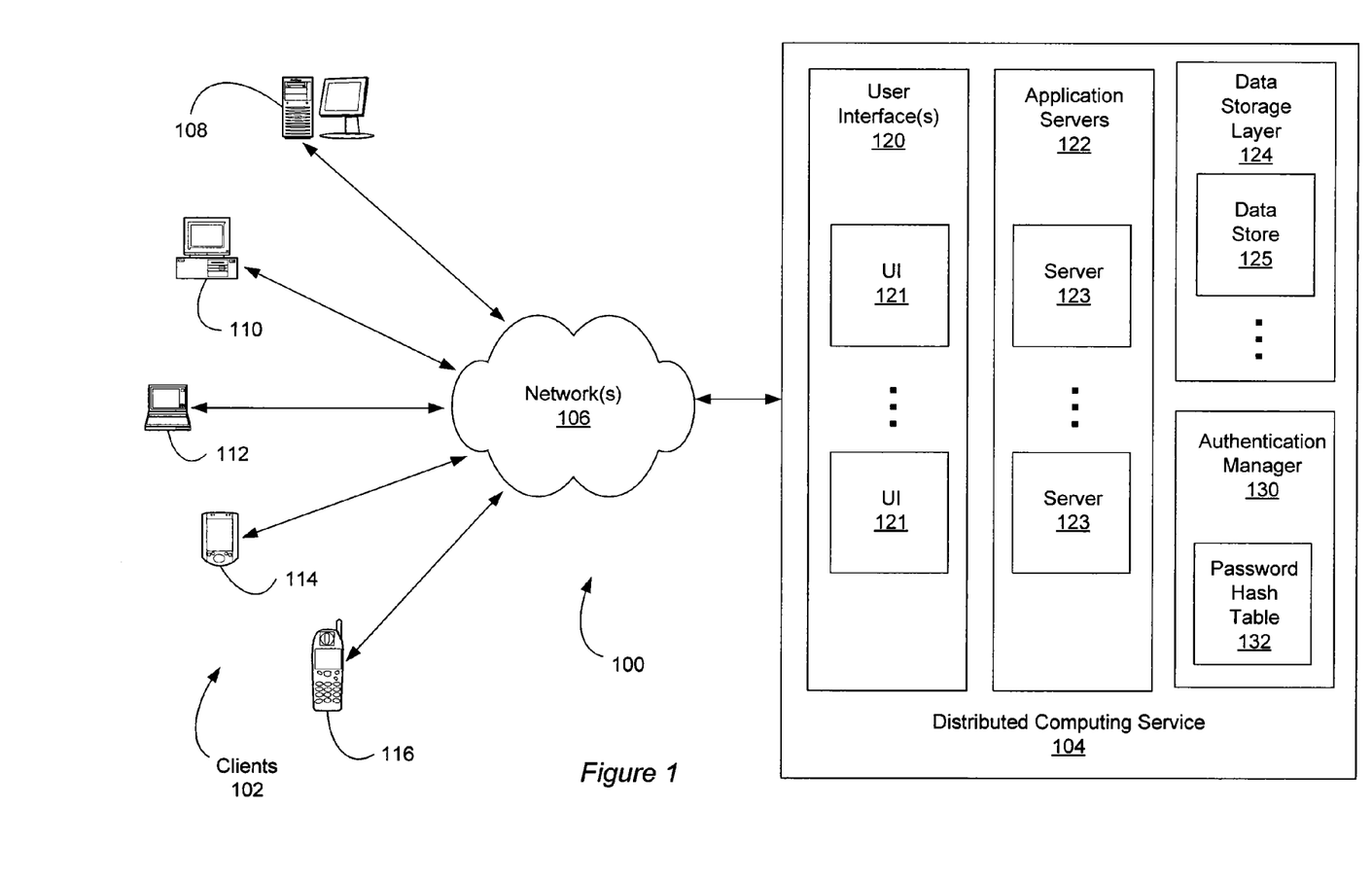
FIG. 1 is a schematic diagram depicting aspects of an example computing environment in which an embodiment of the invention may be implemented.

FIG. 1 depicts aspects of an example computing environment 100 in which an embodiment of the invention may be implemented. As shown, a variety of clients 102 incorporating and/or incorporated into a variety of computing devices may communicate with a distributed computing service 104 through one or more networks 106. For example, a client may incorporate and/or be incorporated into a client application (e.g., software) implemented at least in part by one or more of the computing devices. Examples of suitable computing devices include personal computers, server computers 108, desktop computers 110, laptop computers 112, notebook computers, personal digital assistants (PDAs) 114, smart phones 116, cell phones, and consumer electronic devices incorporating one or more computing device components such as one or more processors, central processing units (CPU), or controllers. Examples of suitable networks 106 include networks utilizing wired and wireless communication technologies and networks operating in accordance with any suitable networking and/or communication protocol (e.g., the Internet).

The distributed computing service 104 may include multiple processing tiers including a user interface tier 120, an application tier 122, and a data storage tier 124. The user interface tier 120 may maintain multiple user interfaces 121, including graphical user interfaces and/or web-based interfaces. The user interfaces may include a default user interface for the service, as well as one or more user interfaces extended by one or more tenants of the service (e.g., via access to one or more APIs). The default user interface may include components enabling tenants to provide service platform extensions and otherwise administer their participation in the functions and capabilities provided by the service. Tenants may be distinguished from other users in this way, and/or tenants may be responsible for costs incurred due to utilization of the distributed computing service by tenant customers (e.g., users of the service as extended by the tenant). Each tier may be implemented with a set of computers and/or computer components including computer servers and processors, and may perform various functions, methods, processes, or operations as determined by the execution of a software application or set of instructions. The data storage tier 124 may include one or more production data stores 125 and one or more testing, validation and/or backup data stores 125. Data stores may be implemented with any suitable data storage technology including structured query language (SQL) based relational database management systems (RDBMS).

When a client moves its domain to a multi-tenant or unified system, the accounts for existing users typically need to be moved from the client domain to the unified system domain. For many kinds of user data, the process of moving is relatively straightforward. For example, user identifiers (IDs), names, addresses, phone numbers, email addresses may be moved directly to the unified system. However, as a standard security precaution, the client domain often does not store the user passwords directly. Instead, only hashed versions of the passwords are stored in the client domain password table. Typically, the password hashing function is a one-way function so that the passwords cannot be determined by a "reverse" calculation. Also, in some cases the password hashing function of the client domain may not be sufficiently secure for use in the unified system. Because the passwords are hashed, the user account data cannot be moved directly to the unified system password table because the passwords cannot be accurately determined. Further, as noted, even if the passwords could be determined, the password hashing function used to generate the hashed values might not be sufficiently secure for use with the unified system and hence the passwords and/or hashing function might have to be replaced.

According to one feature of the present invention, the unified system may import user accounts and password hashes from customers or client domains without compromising the security of the unified system and without requiring users to reestablish their user account on the unified system. In one aspect of the invention, the password hashes from a customer or client domain are re-hashed and stored as an entry in the unified system's password table, along with user account data and metadata for authenticating users. When the unified system authenticates a user, the re-hashed password is used to find the user's entry and the metadata may be used to confirm the user's authorization to access the system or some aspects or features of the system.

In accordance with at least one embodiment of the invention, distributed computing service 104 may be a multi-tenant business data processing platform, and one or more client tenants may host their domain on the distributed computing service 104. These domains often include customer accounts with associated passwords for authentication. Authentication requests from customers, e.g., users of client devices 102, are received by authentication manager 130, which checks a password provided by the user against a password table 132 to authenticate the user. The details of how authentication is performed using a hashed password value stored in a password table are discussed below. However, before providing such details, further information is provided with respect to distributed computing services and service platform functionality in accordance with at least one embodiment of the invention.

As noted, service platform 104 may be operated by an entity in order to provide multiple tenants with a set of business related applications and functionality. These applications and functionality may include ones that a business uses to manage various aspects of its operations. For example, the applications and functionality may include providing web-based access to business information systems, thereby allowing a user with a browser and an Internet or intranet connection to view, enter, or modify certain types of business information.

Such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions. Another business information system that may be provided as part of a service platform is an integrated Customer Relationship Management (CRM) system, which is designed to assist in obtaining a better understanding of customers, enhance service to existing customers, and assist in acquiring new, profitable customers. By way of example, the capabilities or modules of a CRM system may include: sales force automation (SFA), marketing automation, contact list management, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, and supply chain management (SCM) systems.

Both functional advantages and strategic advantages may be gained through the use of an integrated business system comprising ERP, CRM, and other business capabilities, as for example where the integrated business system is integrated with a merchant's eCommerce platform and/or "web store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can, not only process the order, update accounts receivable, inventory databases, and other ERP-based systems, but can also automatically update strategic customer information databases, and other CRM-based systems. These modules and other applications and functionalities may advantageously be integrated and executed by a single code base accessing one or more integrated databases as necessary, forming an integrated business management platform.

However, each merchant is unique in terms of their commercial offerings, desired customer demographics, and marketing techniques, but also in terms of their internal business organization and philosophies. Therefore, a robust integrated business services platform preferably offers not only a rich set of features, but also is capable of being customizable for each business' needs. Thus, it is desirable to provide users of such a system with the ability to develop custom software applications and features that leverage the advantages of the functionality of an integrated business platform in the manner most desired by a particular user.

Figure 2:
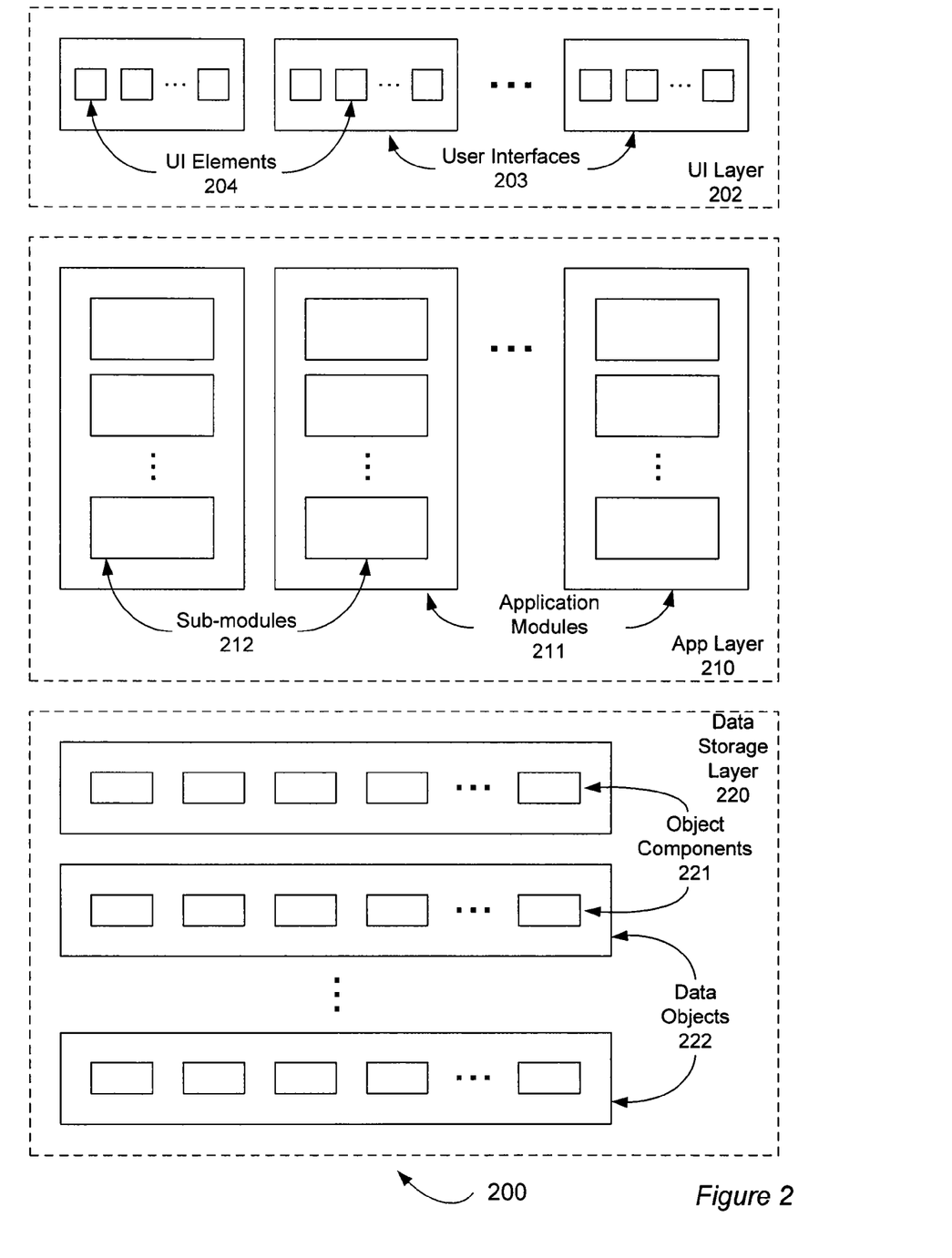
FIG. 2 depicts aspects of an example of a distributed computing service architecture in accordance with at least one embodiment of the invention.

FIG. 2 depicts aspects of an example of a distributed computing service architecture 200 in accordance with at least one embodiment of the invention. The example architecture includes a user interface layer or tier 202 having one or more user interfaces 203. Examples of such user interfaces include graphical user interfaces and application programming interfaces (APIs). Each user interface may include one or more interface elements 204. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols. In one embodiment, proposed service platform extensions may extend the user interface layer by adding a new user interface, removing or replacing an existing user interface, and/or extending an existing user interface. An existing user interface may be extended by adding new interface elements, replacing interface elements, and/or altering/extending user interface elements (such as by altering the previous functionality, display, or purpose of such elements).

The application layer 210 may include one or more application modules 211, each having one or more sub-modules 212. The application modules and/or sub-modules may include any suitable computer-executable code or set of instructions (e.g., as would be executed by a suitably programmed processor or CPU), such as computer-executable code corresponding to a programming language. For example, programming language source code may be compiled into computer-executable code. Alternatively, or in addition, the programming language may be an interpreted programming language such as a scripting language. Each application server (element 123 of FIG. 1) may include each application module. Alternatively, different application servers may include different sets of application modules. Such sets may be disjoint or overlapping. In one embodiment, proposed service platform extensions may extend the application layer by adding new application modules, removing or replacing existing application modules, and/or extending the functionality of existing application modules. An existing application module may be extended by adding new sub-modules, removing or replacing existing sub-modules and/or altering/extending the functionality of existing sub-modules.

The data storage layer 220 may include one or more data objects 222 each having one or more data object components 221, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping. In one embodiment, proposed service platform extensions may extend the data storage layer by adding new data objects, removing or replacing existing data objects, and/or extending existing data objects. Existing data objects may be extended by adding new data object components, removing or replacing existing data object components, and/or altering/extending existing data object components.

Note that the example computing environment(s) depicted in FIGS. 1 and 2 are not intended to be a limiting example. Alternatively, or in addition, computing environments in accordance with at least one embodiment of the invention may include any suitable system that is intended to be used as the destination for data elements that are subject to protection by an access control or security process, typically by use of a user identifier and password. Examples of suitable systems include hardware systems, computing systems incorporating firmware or re-configurable processors, and stand-alone or local-only software systems or applications. Although further examples below may reference the example computing environment depicted in FIGS. 1 and 2, it will be apparent to one of skill in the art that the examples may be adapted for alternate computing devices, systems, and environments.

Users, such as the users of client devices 102 who desire access to a domain supported by distributed computing service 104, are typically authenticated by hashing their password using a known hashing algorithm and comparing the hashed password to a value stored in a password table that contains entries for valid users, and that typically includes the user ID for the user along with a hashed password value for the user that was previously established and stored for the user account.

When a user password is authenticated, the password provided by the user is hashed and the password hash is compared to the hashed password value stored in the password table. The user is authenticated and permitted to access one or more of the system, a network, a device, data, or specific functions of the system if the two hashed values match.

Figure 3:
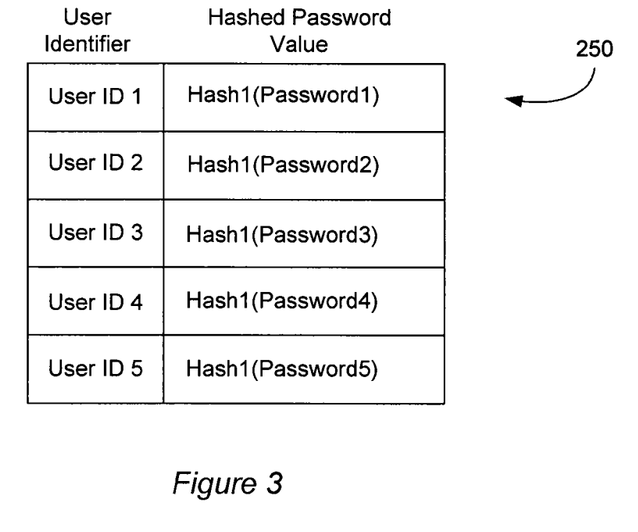
FIG. 3 illustrates an example of a password table showing entries for multiple users with associated hashed password values.

FIG. 3 is a diagram illustrating an example of a password table 250 for a particular domain. Entries for user accounts are stored in the password table at locations typically indexed by a user identifier and including the hashed password value for the user account. For security purposes, the password values themselves are generally not stored in the password table. In the example of FIG. 3, password table 250 contains entries for five users, where each entry includes a user identifier and password hash value generated when the user established a password for the user's account, where the password hash function Hash1 for the client domain system is used to produce the password hash values. Thus, in this example, password table 250 includes a row for User ID 1 and an associated value Hash1 (Password1) obtained from hashing the user's password Password1 using the client domain's password hash function Hash1. Typically, a user is authenticated by entering their user ID, e.g. User ID 1, and their password, e.g. Password1. The password provided by the user is hashed using Hash1 and the resulting value compared to the value stored for the user in table 250. If the calculated and stored hashed password values match, then the user is authenticated and permitted access.

However, different customer authentication systems may use different hashing algorithms, so that password hashes from different customer authentication systems will produce different password hash values for the same password value.

This presents a problem for a unified system, such as a multi-tenant system, that supports multiple customer authentication systems because password hashes from client domain authentication systems that have different hashing algorithms can't be combined into the password table for the unified system. The unified system's password hashing algorithm will generate a different password hash value from the client domain's hashing function, which will cause the user authentication process to fail for users migrated from the client domain system. Also, because a user's password is typically not stored in the domain's password table, it cannot be recovered and used to generate a password hash value from the unified system's hash function for storage in the unified system's password table. Further, password hash functions are ideally one way functions to prevent reverse calculation of the password from the hashed value, which also prevents the original password from being reverse calculated for inclusion in the password table for the unified system. Consequently, many conventional systems require each user to reestablish their user account when a domain migrates to a multi-tenant system, which may be disruptive to the client domain's user base.

In the present invention, entries in a client domain's password table are merged into a unified system, where the client domain's hash is different from the unified system's hash function. An example of a simplified password table merging process 300 is illustrated in the control flow diagram of FIG. 4. For each entry in the client domain's password table, the user entry is obtained, at step 302, and the hashed password value of the entry is re-hashed at step 304 using the hashing algorithm for the unified system. The resulting re-hashed value is then stored at step 306 in an entry in the unified system password table, where the entry includes a user identifier, the re-hashed password value, and metadata that identifies the client domain or the client domain's hash function. Process 300 continues from step 310 until no further entries exist in the client domain password table.

Figure 4:
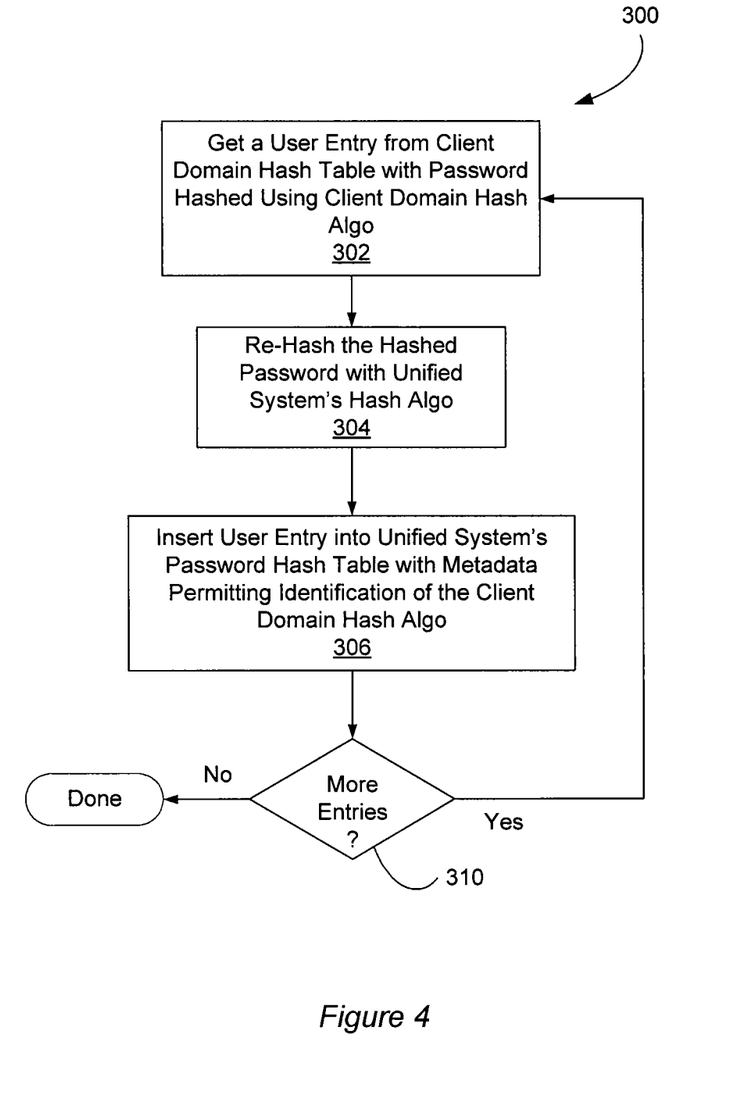
FIG. 4 is a control flow diagram illustrating the steps or stages of an exemplary process that may be performed to migrate password table entries from a client domain to a unified system password table, in accordance with at least one embodiment of the invention.
Figure 5:
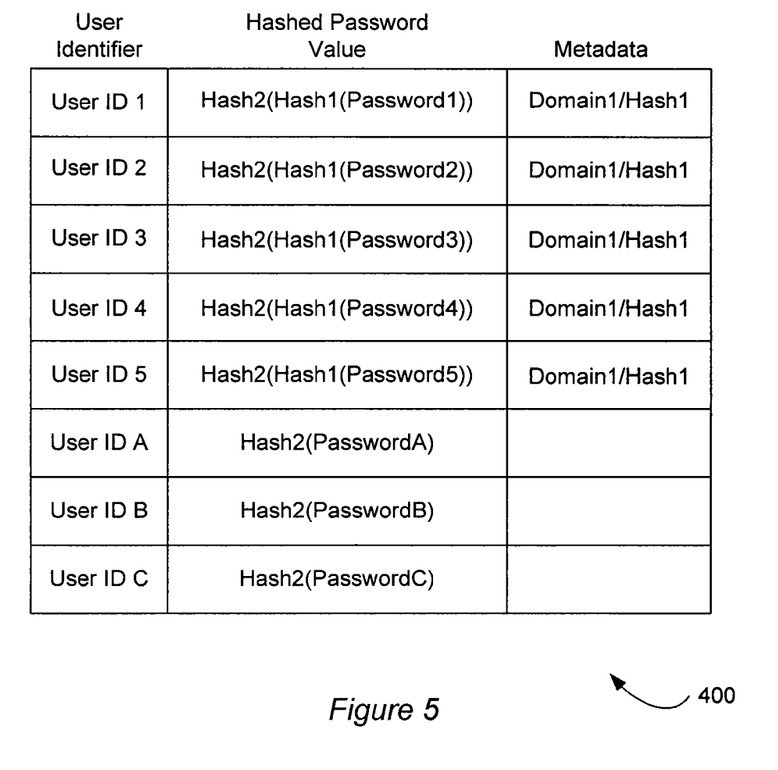
FIG. 5 illustrates an example of a unified password table having user entries migrated from a client domain system having a different password hash function from the password hash function for the unified system along with user entries stored with password hash values generated using the unified system password hash function.

FIG. 5 illustrates a simplified example of the client domain accounts shown in the client domain password table 250 example of FIG. 3 merged into a unified system password table 400 using the process 300 of FIG. 4. Each entry in the client domain's password table 250 is recreated in the unified system's password table 400. The stored value in table 250 of the user's password hashed with the client domain's hash algorithm, e.g. Hash1 (Password1), is re-hashed using the hash algorithm for the unified system, e.g. Hash2(Hash1 (Password1)), and stored in the unified system password table 400 along with metadata for the user entry, such as an identifier for the client domain or an identifier for the client domain hash function. The entries from the client domain table 250 are merged into the unified system's password table 400 without having the original user passwords and with the level of security provided (and typically required) by the unified system's hash algorithm. Note that the password table 400 of FIG. 5 also includes additional user entries, e.g., User ID A, B and C, that were not part of the client domain before it was migrated. The password hash values for these entries were generated using the unified system's hash algorithm Hash2 and no metadata is stored pertaining to a different hashing algorithm having been used to generate the stored password hash value for these entries. Thus, user entries from multiple domains concurrently reside in the password table 400. Note that different client domains can have different hash functions, which may be discerned from the identifier in the metadata.

By way of specific example, a domain for a pharmacy client computes its password hashes using an MD5 algorithm as follows:

pharmacyhash=md5(password)

The hashed passwords are stored in the pharmacy client domain in accordance with the MD5 hash algorithm Because the unified system uses a different hash function, e.g. sha256, the pharmacy domain's password table cannot be directly merged with the unified system's password table. This is because the sha256 hash function will generate a hashed password value that is different from the hashed password value stored in the password table and as a result, the user authentication process will fail.

In the present invention, the unified system imports the password table entries from the pharmacy domain by computing a new password hash value from the pharmacy domain password hash value using the unified system hash algorithm, e.g., sha256. For example:

Unifiedhash=metadata: <from pharmacy>,
 <salt>,
 sha256(salt, pharmacyhash).

The pharmacy password hash value is re-hashed along with a salt value using the sha256 algorithm and an entry for the user is created in the unified system password table that includes the password hash value produced by sha256(salt, pharmacyhash). The entry placed in the unified system password table includes metadata that indicates either the pharmacy domain or the sha256 has function and includes the salt value.

Figure 6:
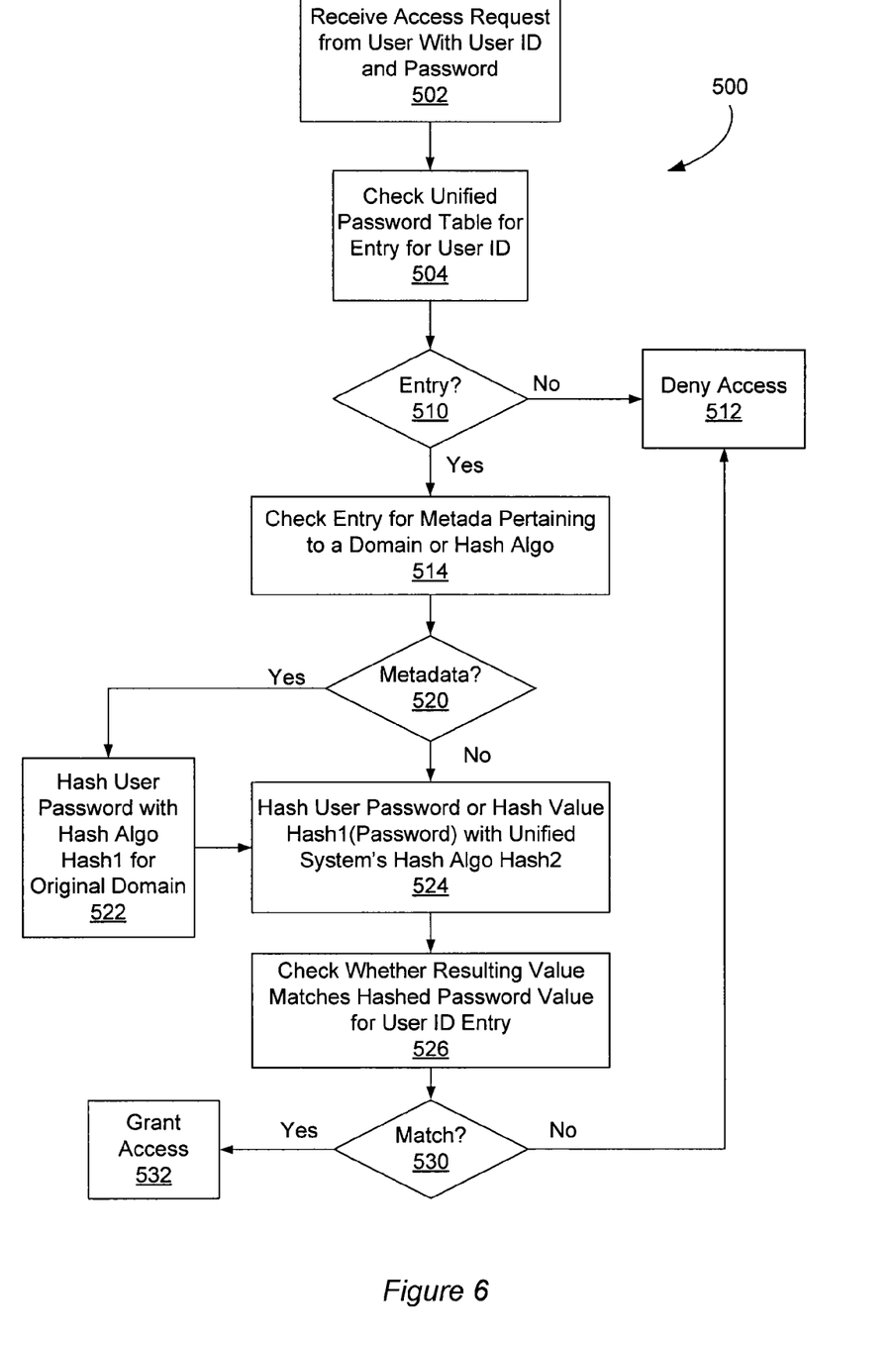
FIG. 6 is a control flow diagram illustrating an example of a user authentication process in a unified system that may include users migrated from a client domain with a different password hash function in accordance with one aspect of the present invention.

FIG. 6 is a control flow diagram illustrating an example of a customer user account authentication process 500 in a unified system in accordance with one aspect of the present invention. At step 502, an access request from a user is received in the unified system and includes a user identifier (User ID) and a password, e.g., User ID 1 and Password1. At step 504, the unified system checks the unified password table for an entry matching the User ID. If no entry is found in the table, then control branches at step 510 to step 512 and the user is denied access. If an entry is found, then, in this embodiment, control flows to step 514 where the matching entry is checked for metadata pertaining to a client domain or hash algorithm, which indicates that the stored password hash value was originally hashed using the client domain's hash algorithm Hash1. If no such metadata is stored with the user entry, then control branches at step 520 to step 524 and the password received in the access request is hashed directly using the unified system's password hash function Hash2. For example, for a request containing User ID A and PasswordA, Hash2 is used to generate the value Hash2 (PasswordA). At step 526, the resulting password hash value is compared to the stored password hash value, e.g., the calculated Hash2(PasswordA) value is compared to the stored value for User ID A, and control flows at step 530 to step 532 where access is granted if the hash values match. If the metadata is found in the unified password table for the user entry, e.g., Domain1 or Hash1 for User ID 1, then control branches at step 520 to step 522, where the metadata is used to identify the original hash algorithm, e.g., Hash1, and the password received in the access request, Password1, is hashed using the original hash algorithm Hash 1 to obtain a calculated hash value, e.g. Hash1 (Password1). Control then branches to step 524, where the resulting calculated value, e.g. Hash1 (Password1), is re-hashed with the unified system hash algorithm Hash2, e.g., Hash2(Hash1 (Password1)). At step 526, the resulting password hash value is compared to the stored password hash value, and access is granted at step 532 if the hash values match. The unified system is therefore able to authenticate customers from the client domain using the unified system's password table without forcing customers to re-establish their accounts.

Figure 7:
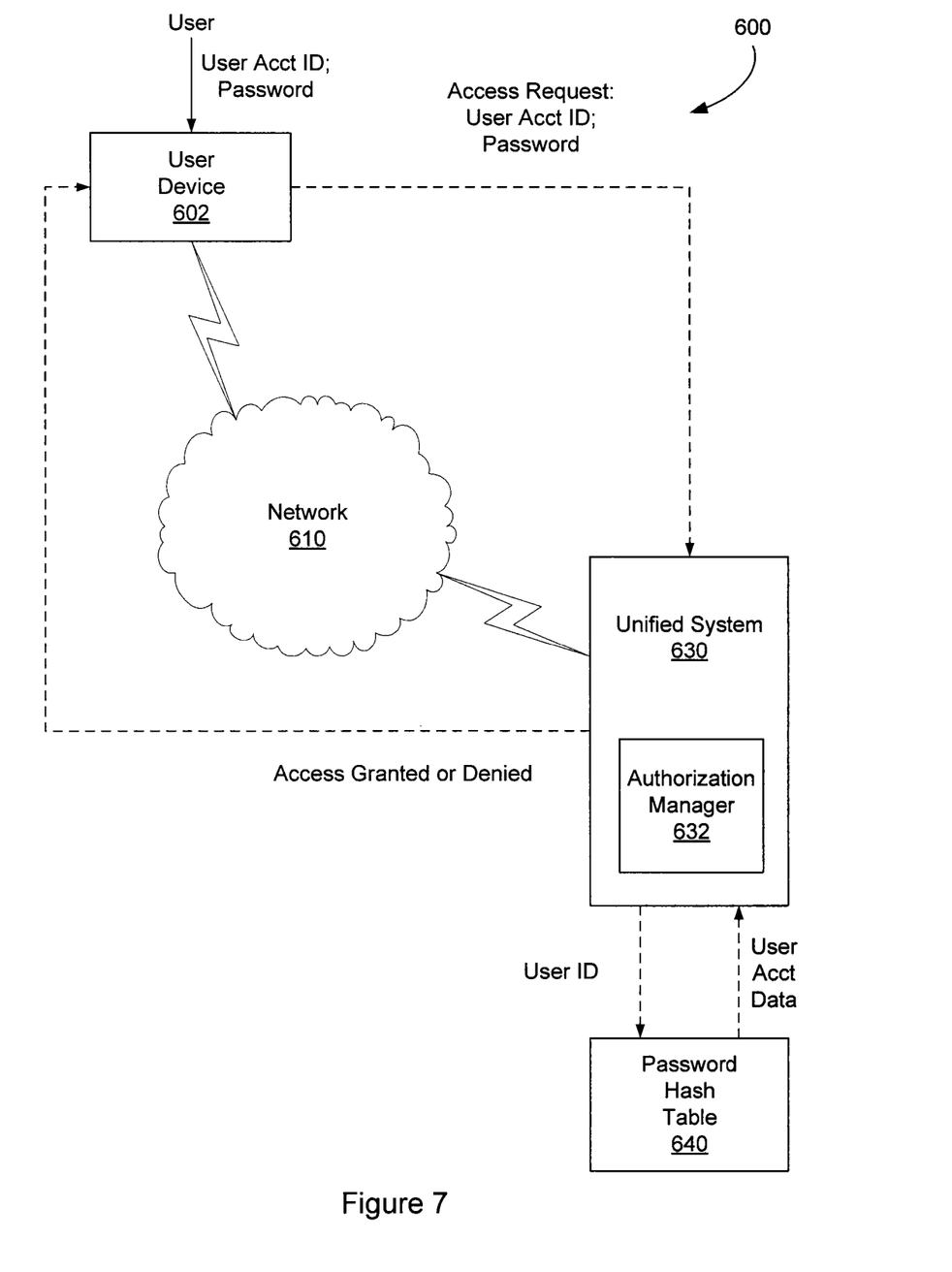
FIG. 7 is a functional block diagram illustrating an example of an authentication sequence for a user of a customer domain in a network where the user, the client domain and the unified system are coupled through a network.

FIG. 7 is a functional block diagram illustrating an example of an authentication sequence for a user of a customer domain in a unified system where the user device 602, the client domain and the unified system 630 are coupled though a network 610. The user device 602 and unified system 630 are able to communicate through one or more networks 610, e.g., the Internet. In one embodiment, a user enters their user account identifier and password into the user device 602, which securely transmits an authentication request with the user account id and password to the unified system 630. In this embodiment, an authorization manager in the unified system handles authentication requests received by the unified system and performs the process of FIG. 6 or a similar process. The authorization manager 632 accesses the unified system's password table 640 using the user's account identifier to obtain the user account data for the user. The authorization manager 632 checks the metadata in the user's account data to see if the user account was migrated from a client domain having a different password hash algorithm from that of the unified system. If the metadata indicates that a different password hash algorithm, e.g. HashA, was originally used to hash the user's password in the client domain, then the authorization manager 632 hashes the received password with HashA and then re-hashes the value with the hash algorithm, HashB, for the unified system 630. The authorization manager 632 then compares the re-hashed value, HashB(HashA(Passwd)), to the user's password hash value stored in the user's entry in the unified system's password table and confirms authentication of the user if the values match. In this case the authorization manager 632 sends an authorization message to the user device 602 indicating that the user has been authenticated. If the values do not match, then the authorization manager 632 may send a message informing the user that they have not been authenticated and hence are denied access to the relevant system, network, application, etc.

The present invention permits a unified system (such as distributed computing service 104 of FIG. 1, a multi-tenant business data processing platform, etc.) to migrate and support passwords from multiple domains having different password hashing algorithms Customers of the client domains are not required to reestablish their accounts in the unified system. And the unified system is able to support domains with heterogeneous hashing algorithms with little or no additional overhead compared to user entries established with the unified system's hashing algorithm. Furthermore, where the client domain's hash algorithm is insufficiently secure for the unified system, e.g., it is a computationally inexpensive or weak algorithm, use of the unified system's more secure hash algorithm will raise the level of security for the accounts of the client domain to the same level as that of the unified system.

Note that although the previous description of one or more embodiments of the invention has been directed to implementation of the invention within a multi-tenant distributed computing platform or service that provides one or more of ERP, CRM, or eCommerce functions, embodiments of the invention may also be utilized with other types of systems where a client's services can be moved to a unified multi-tenant system.

In accordance with at least one embodiment of the invention, the system, apparatus, methods, processes and/or operations for implementing an embodiment of the invention may be wholly or partially implemented in the form of a set of instructions executed by one or more programmed computer processors, such as a central processing unit (CPU) or microprocessor. Such processors may be incorporated in an apparatus, server, network element, client or other computing device operated by, or in communication with, other components of the system.

Figure 8:
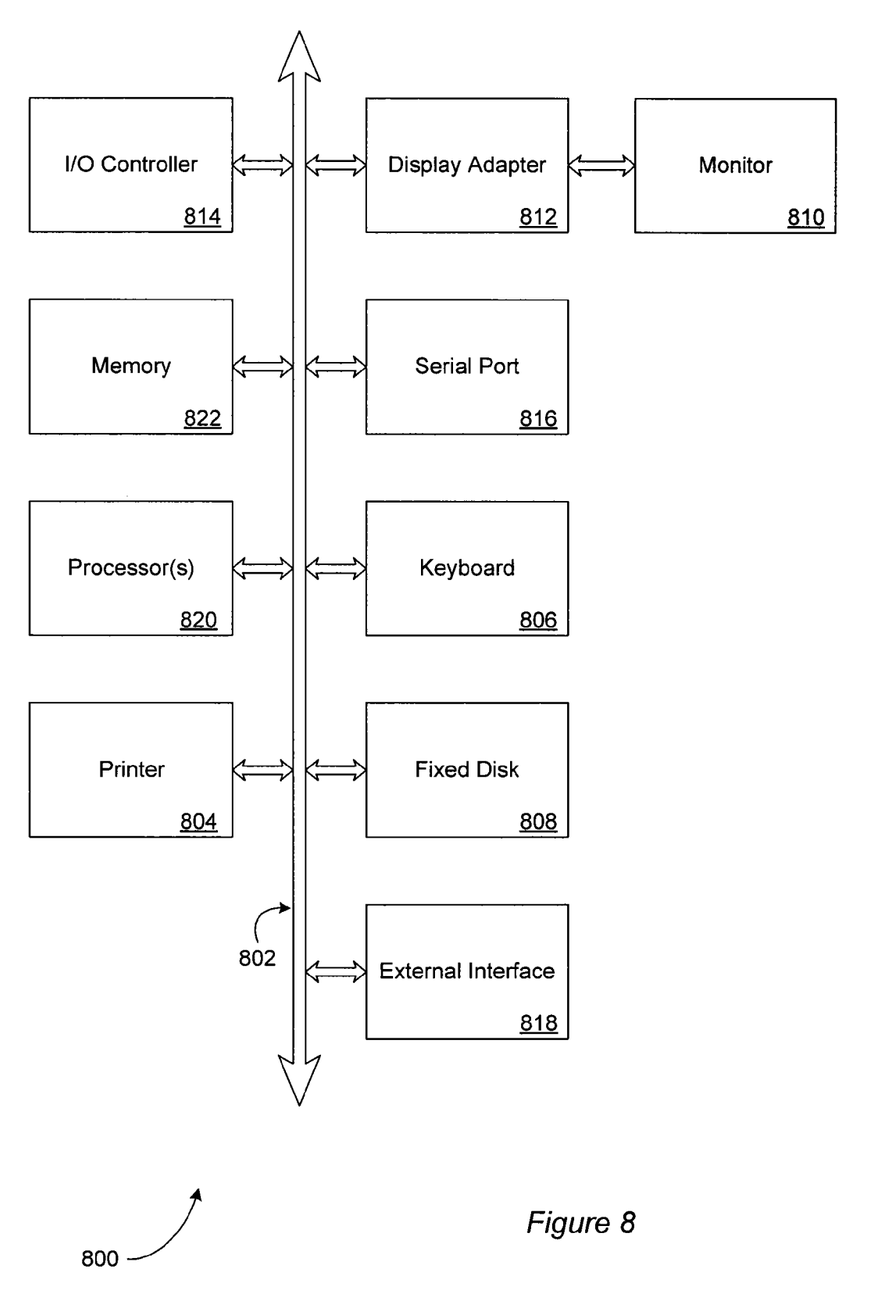
FIG. 8 depicts aspects of elements that may be present in a computer device and/or system configured to implement a method, system and/or process in accordance with some embodiments of the present invention.

As an example, FIG. 8 depicts aspects of elements that may be present in a computer device and/or system 800 configured to implement a method and/or process in accordance with some embodiments of the present invention. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention as claimed.

We claim:

1. A method for migrating client domains, the method comprising the steps of:
    identifying at least one user account entry in a client domain password table, where the user account entry includes a user identifier and a first hashed password value, where the first hashed password value is derived from hashing a user password with a client domain hash algorithm;
    hashing the first hashed password value using a multi-tenant system hash algorithm to obtain a second hashed password value; and
    creating a user account entry in a multi-tenant system password table having a user identifier, a stored password value, and metadata, where the user identifier for the user account entry in the multi-tenant system password table corresponds to the user identifier from the user account entry in the client domain password table, and the stored password value is the second hashed password value.

2. The method for migrating client domains of claim 1, further comprising:
    receiving a first access request having a user identifier and a password value;
    obtaining a user entry in the multi-tenant system password table corresponding to the first received user identifier;
    if the metadata from the user entry for the first received user identifier indicates a corresponding client domain hash algorithm, hashing the received password value using the corresponding client domain hash algorithm to produce a first hash result value, hashing the first hash result value using the multi-tenant system hash algorithm to obtain a second hash result value;

comparing the second hash result value to the stored password value in the user entry for the first received user identifier; and replying to the first access request with an authorization message if the second hashed result value matches the stored password value in the user entry for the first received user identifier.

3. The method for migrating client domains of claim 2, further comprising:

receiving a second access request having a user identifier and a password value;

obtaining a user entry in the multi-tenant system password table corresponding to the second received user identifier;

if the metadata for the user entry for the second received user identifier does not indicate a corresponding client domain hash algorithm, hashing the password value from the second access request using the multi-tenant system hash algorithm to obtain a third hash result value;

comparing the third hash result value to the stored password value in the user entry for the second received user identifier; and replying to the second access request with an authorization message if the third hash result value matches the stored password value in the user entry for the second received user identifier.

4. The method for migrating client domains of claim 1, further comprising:

identifying another user account entry in another client domain password table, where the user account entry includes a user identifier and a third hashed password value, where the third hashed password value is derived from hashing a user password for the user account entry with another client domain hash algorithm;

hashing the third hashed password value using the multi-tenant system hash algorithm to obtain a fourth hashed password value; and creating a user account entry in the multi-tenant system password table having a user identifier, a stored password value, and metadata, where the user identifier for the user account entry in the multi-tenant system password table corresponds to the another user identifier from the user account entry in the another client domain password table, and the stored password value is the fourth hashed password value.

5. The method for migrating client domains of claim 1, wherein the multi-tenant system hash algorithm requires greater computational resources to perform than the client domain hash algorithm.

6. A multi-tenant authorization management system, comprising:

a password data store, the data store having stored therein a plurality of user entries, each user entry having a user identifier, a stored password hash value and metadata, where the metadata indicates whether or not the stored password hash value associated with the user identifier was hashed using a corresponding client domain hash function and then re-hashed using a multi-tenant hash function;

at least one server computer coupled to the password data store and configured to:

receive an access request having a user identifier and a password value;

obtain a user entry from the password data store corresponding to the received user identifier;

determine whether the user entry for the received user identifier includes metadata indicating a corresponding client domain hash function and, if so, hash the received password value using the corresponding client domain hash function to produce a first hash result value and re-hash the first hash result value using the multi-tenant hash function to generate a second hash result value;

compare the second hash result value to the stored password hash value in the user entry for the received user identifier; and reply to the access request with an authorization message if the second hashed result value matches the stored password hash value in the user entry for the received user identifier.

7. The multi-tenant authorization management system of claim 6, wherein the server computer is further configured to determine whether the metadata for the user entry for the received user identifier indicates no corresponding client domain hash function and, if so, hash the received password value using the multi-tenant hash function on to obtain the second hash result value.

8. The multi-tenant authorization management system of claim 6, wherein:

the password data store includes at least one user entry having a stored password hash value that was hashed using a first client domain hash function and at least one user entry having a stored password hash value that was hashed using a second client domain hash function, where the first and second client domain hash functions are different and the metadata for each user entry indicates the corresponding client domain hash function used to hash the stored password hash value; and the server computer is further configured to identify the corresponding client domain hash function from the metadata for the user entry for the received user identifier, hash the received password value using the identified corresponding client domain hash function to produce the first hash result value and re-hash the first hash result value using the multi-tenant hash function to generate the second hash result value.

9. The multi-tenant authorization management system of claim 6, wherein the multi-tenant hash function requires greater computational resources to perform than at least one corresponding client domain hash function.

10. A non-transitory computer readable medium having computer-executable instructions stored thereon which, when executed by a computer, will cause the computer to perform a process for migrating client domains comprising the steps of:

identifying at least one user account entry in a client domain password table, where the user account entry includes a user identifier and a first hashed password value, where the first hashed password value is derived from hashing a user password with a client domain hash algorithm;

hashing the first hashed password value using a multi-tenant system hash algorithm to obtain a second hashed password value; and creating a user account entry in a multi-tenant system password table having a user identifier, a stored password value, and metadata, where the user identifier for the user account entry in the multi-tenant system password table corresponds to the user identifier from the user account entry in the client domain password table, and the stored password value is the second hashed password value.

11. The non-transitory computer readable medium of claim 10, the medium having further computer-executable instructions stored thereon which, when executed by a computer, will cause the computer to perform the steps of:
  receiving a first access request having a user identifier and a password value;
  obtaining a user entry in the multi-tenant system password table corresponding to the first received user identifier;
  if the metadata from the user entry for the first received user identifier indicates a corresponding client domain hash algorithm, hashing the received password value using the corresponding client domain hash algorithm to produce a first hash result value, hashing the first hash result value using the multi-tenant system hash algorithm to obtain a second hash result value;
  comparing the second hash result value to the stored password value in the user entry for the first received user identifier; and
  replying to the first access request with an authorization message if the second hashed result value matches the stored password value in the user entry for the first received user identifier.

12. The non-transitory computer readable medium of claim 11, the medium having further computer-executable instructions stored thereon which, when executed by a computer, will cause the computer to perform the steps of:
  receiving a second access request having a user identifier and a password value;
  obtaining a user entry in the multi-tenant system password table corresponding to the second received user identifier;
  if the metadata for the user entry for the second received user identifier does not indicate a corresponding client domain hash algorithm, hashing the password value from the second access request using the multi-tenant system hash algorithm to obtain a third hash result value;
  comparing the third hash result value to the stored password value in the user entry for the second received user identifier; and
  replying to the second access request with an authorization message if the third hash result value matches the stored password value in the user entry for the second received user identifier.

13. The non-transitory computer readable medium of claim 10, the medium having further computer-executable instructions stored thereon which, when executed by a computer, will cause the computer to perform the steps of:
  identifying another user account entry in another client domain password table, where the user account entry includes a user identifier and a third hashed password value, where the third hashed password value is derived from hashing a user password for the user account entry with another client domain hash algorithm;
  hashing the third hashed password value using the multi-tenant system hash algorithm to obtain a fourth hashed password value; and
  creating a user account entry in the multi-tenant system password table having a user identifier, a stored password value, and metadata, where the user identifier for the user account entry in the multi-tenant system password table corresponds to the another user identifier from the user account entry in the another client domain password table, and the stored password value is the fourth hashed password value.

14. A method for authenticating users in a multi-tenant system, the method comprising the steps of:
  receiving an authentication request to a multi-tenant system, where the authentication request includes a user account identifier and a password;
  searching the multi-tenant system's password table for an entry corresponding to the received user account identifier;
  if a matching entry is found, checking the matching entry for metadata indicating that a hashed password value stored in the matching entry was generated by a first hash algorithm that is different from a second hash algorithm selected for hashing passwords in the multi-tenant system;
  if the metadata indicates that the hashed password value in the matching entry was generated by the first hash algorithm, hashing the password in the authentication request using the first hash algorithm to generate a first received hashed password result and hashing the first received hashed password result with the second hash algorithm to generate a second received hashed password result; and
  if the second received hashed password result matches the hashed password value stored in the user entry, authenticating the received authentication request.

15. The method for authenticating users in a multi-tenant system of claim 14, further comprising:
  if the metadata indicates that the hashed password value was generated by the second hash algorithm, hashing the password in the authentication request using the second hash algorithm to generate the second received hashed password result.

* * * * *